United States Patent [19]
Jones, Jr.

[11] Patent Number: 5,974,334
[45] Date of Patent: Oct. 26, 1999

[54] MULTI-POSITIONAL HANDSET FOR PERSONAL DIGITAL ASSISTANT

[75] Inventor: James H. Jones, Jr., Apex, N.C.

[73] Assignee: Ericsson Inc., Research Triangle Park, N.C.

[21] Appl. No.: 08/951,426

[22] Filed: Oct. 16, 1997

[51] Int. Cl.⁶ ................................................. H01M 10/44
[52] U.S. Cl. ...................... 455/573; 455/556; 455/557; 455/572; 455/573; 379/38; 379/93; 379/435; 379/446
[58] Field of Search ..................... 379/435, 436, 379/446, 455, 96, 110, 58, 62, 61, 93; 455/573, 422, 41, 575, 404, 464, 572, 462, 557, 556; 345/173, 179, 901, 903; 395/281, 893, 733, 800, 200.41; 364/708.1; 320/23

[56] References Cited

U.S. PATENT DOCUMENTS

| | | | |
|---|---|---|---|
| 4,083,617 | 4/1978 | Wyatt | 339/47 R |
| 5,020,090 | 5/1991 | Morris | 379/58 |
| 5,071,358 | 12/1991 | Petrosky | 439/77 |
| 5,142,573 | 8/1992 | Umezawa | 379/454 |
| 5,333,176 | 7/1994 | Burke et al. | 379/58 |
| 5,410,597 | 4/1995 | Kepley, III et al. | 379/449 |
| 5,625,673 | 4/1997 | Grewe et al. | 379/61 |
| 5,828,966 | 10/1998 | Davis et al. | 455/573 |

OTHER PUBLICATIONS

Model ET–547/ET–557 Cordless Telephone (installation), RadioShack, Jun. 27, 1996.

*Primary Examiner*—David R. Hudspeth
*Assistant Examiner*—Charles Chow
*Attorney, Agent, or Firm*—Myers Bigel Sibley & Sajovec, P.A.

[57] ABSTRACT

A personal digital assistant (PDA) having a multi-positional handset is disclosed. A PDA has a base with a recessed handset cradle and a handset with a shape complementary to the configuration of the cradle. A power storage device is included within the handset and a power supply device is included within the base. For on-the-road use, the handset is configured to be removably secured within the cradle in a substantially flush configuration with the base. For office use, the handset is configured to be removably secured to the base in a substantially non-flush configuration that is easy for a user to grasp. The power storage device can receive power from the power supply device when the handset is in either a flush or non-flush configuration.

13 Claims, 7 Drawing Sheets

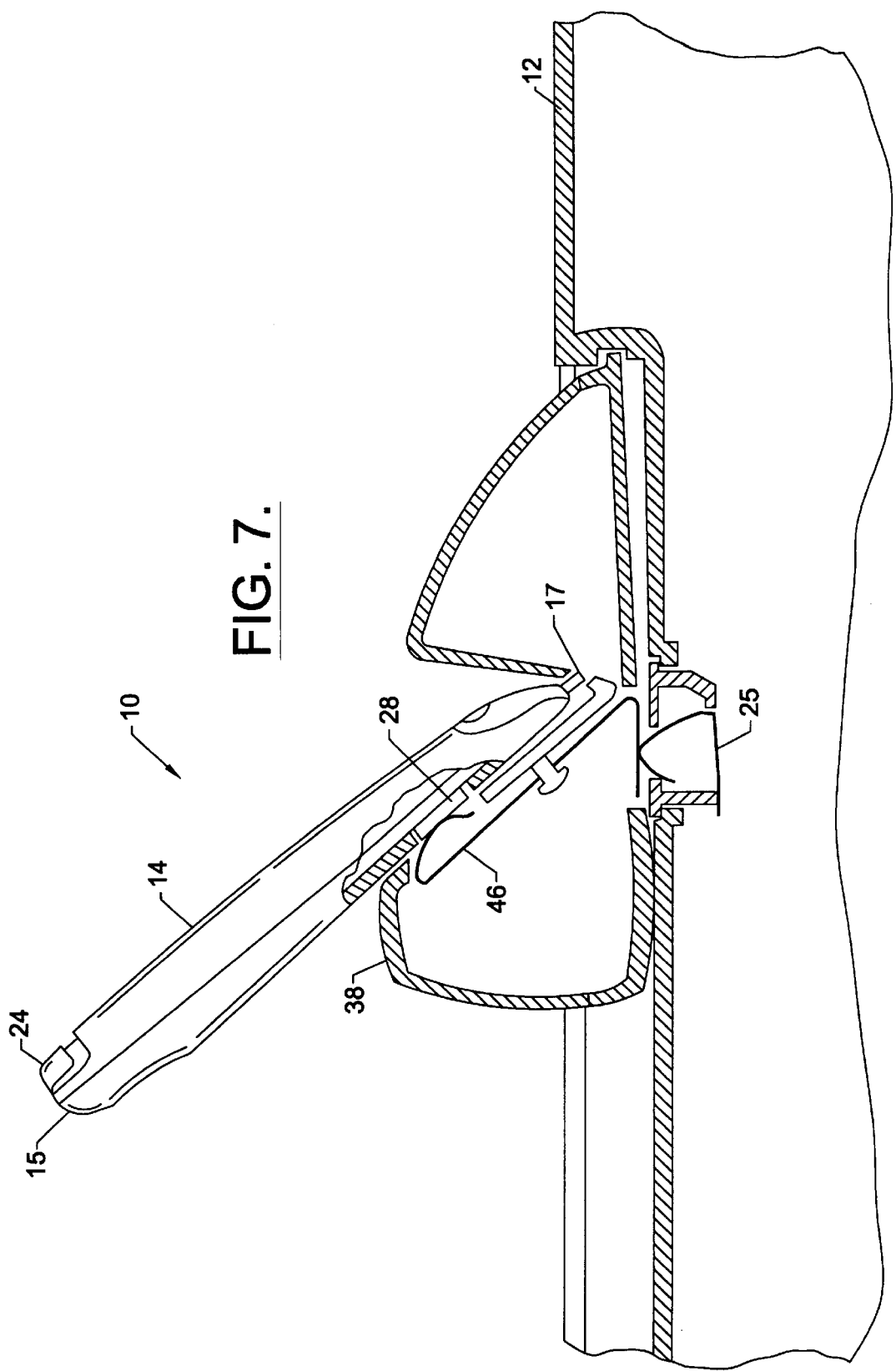

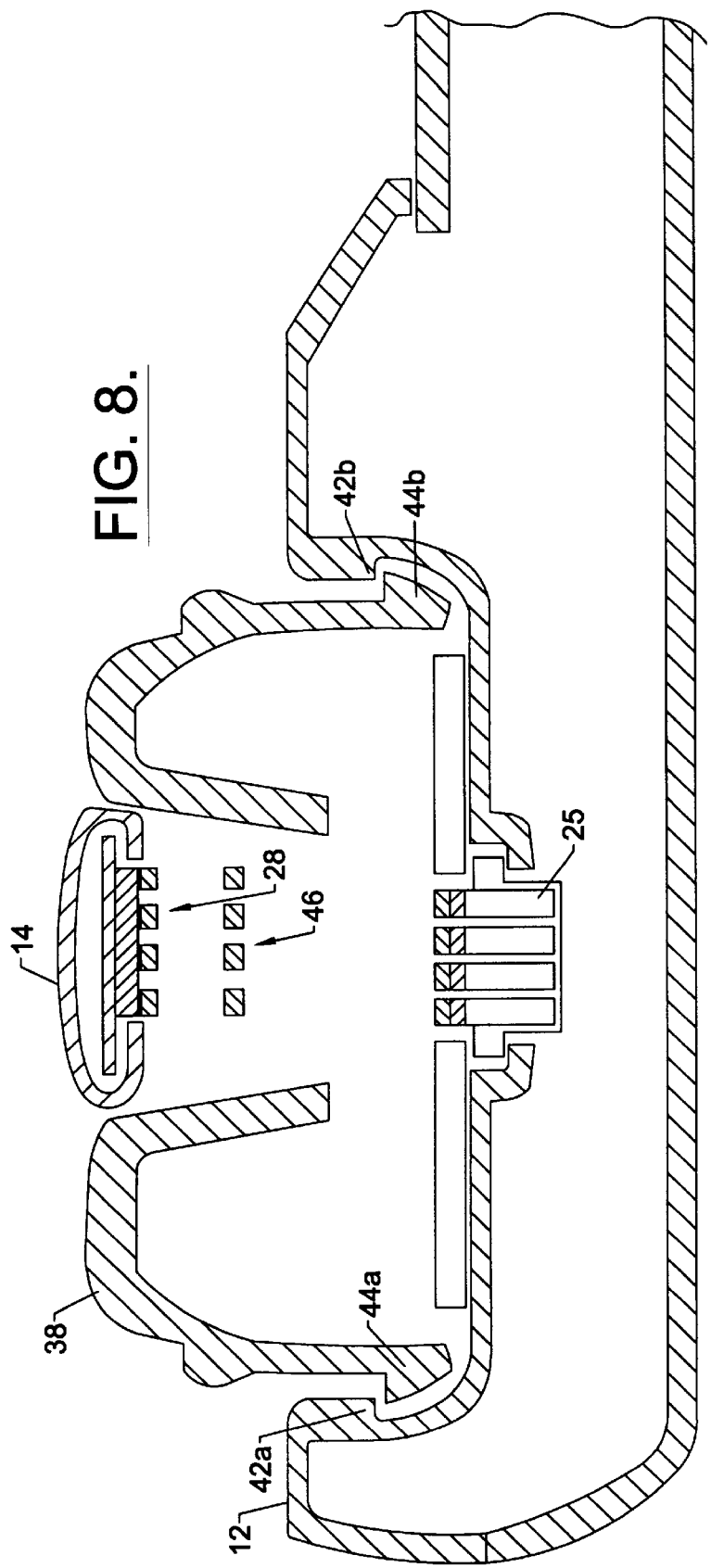

MULTI-POSITIONAL HANDSET FOR PERSONAL DIGITAL ASSISTANT

FIELD OF THE INVENTION

The present invention relates generally to communication devices, and more particularly to personal digital assistants.

BACKGROUND OF THE INVENTION

With the increased mobility of many in today's workforce, the demand for mobile computing and communication capabilities outside of the office has also increased. Those who typically work outside the office such as salespeople and field professionals often require the ability to communicate with others and access various data files. In response to this demand, personal digital assistants (PDAs) have been developed. A PDA is a compact device that can serve various functions of a cellular phone, facsimile transmitter, personal organizer, and the like. PDAs typically include a stylus and touch screen for user input, and may include a keyboard. PDAs can be used for sending and retrieving e-mail, Web browsing, and data-sharing applications over the Internet, intranet or corporate networks.

PDAs incorporating voice communication capabilities may include a handset. Because PDAs are designed for mobility, they are often small, compact devices. Accordingly, a handset associated therewith is typically small in size as well. To protect a handset during travel and to prevent it from becoming dislodged from a PDA, the handset is mounted within a PDA in a secure manner. Often times a handset is "buried" deep within the casing of a PDA so as to be flush with the body of the PDA.

Unfortunately, a tradeoff for securely mounting a handset within a PDA is that removal of the handset from the PDA can be cumbersome and somewhat difficult. This may hinder acceptance of PDAs for use within the office in place of traditional desk top telephone devices.

It may be difficult to make PDA handsets more accessible in the office. Because a PDA handset is typically untethered to a PDA, it often operates under battery power. Consequently, a PDA handset is typically configured to be recharged when secured within its holder in the PDA. In addition, the handset may serve various functions, such as allowing the PDA to be used as a speaker phone. By raising the handset somewhat from its holder to increase user accessibility, the ability to recharge the handset or use the PDA as a speaker phone may become difficult.

SUMMARY OF THE INVENTION

It is therefore an object of the present invention to facilitate increasing the use of PDAs within an office setting for telephone communications by making the handsets accessible.

It is another object of the present invention to provide a multi-positional PDA handset configuration wherein the handset can be secured during travel.

It is another object of the present invention to provide a PDA with a handset configuration that is readily accessible within an office setting and that maintains full capabilities of the handset, including speaker phone capabilities, and the like.

These and other objects of the present invention are provided by a personal digital assistant having a base with a recessed handset cradle and a handset with a shape or configuration complementary to the configuration of the cradle. A power storage device is included within the handset and a power supply device is included within the base. For travelling, the handset is configured to be removably secured within the cradle in a substantially flush configuration with the base. For office use, the handset is configured to be removably secured to the base in a substantially non-flush configuration that is easy for a user to grasp.

Positioned within the cradle is a first electrical connector electrically connected to a power supply. A second electrical connector is located on a medial portion of the handset and is electrically connected to the power storage device within the handset. The second electrical connector is configured to make electrical contact with the first electrical connector when the handset is secured within the cradle in a substantially flush configuration.

An adapter having opposite first and second ends is provided for removably securing the handset to the base in a substantially non-flush configuration. The first end of the adapter is configured to be removably secured to the base in a position that substantially overlies the first electrical connector located within the cradle. The second end of the adapter is configured to removably receive the handset therein. A plurality of conductive traces extend between the first and second ends of the adapter. When the handset second end portion is removably inserted within the adapter, the second electrical connector is electrically connected to the first electrical connector via the conductive traces and power can be supplied to the power storage device from the power supply device.

The cradle includes a pair of opposing edge portions, each having a respective lip portion with the first electrical connector positioned therebetween. The adapter includes a pair of spaced apart, biased tabs extending outwardly therefrom. Each tab is configured to cooperate with a respective lip portion and thereby removably secure the adapter to the base.

The present invention is advantageous because it facilitates using PDAs when traveling and when in the office. When the user is traveling with the PDA, the handset can be securely mounted within the base to protect the handset from becoming damaged or dislodged. In an office setting the handset is readily available for grasping. Accordingly, a PDA incorporating the handset configuration of the present invention can be used as conveniently within an office environment as a typical desktop telephone.

BRIEF DESCRIPTION OF THE DRAWINGS

FIG. 7 is a side section view of a handset inserted within an adapter in a substantially non-flush configuration.

FIG. 8 is a front section view of a handset inserted within an adapter in a substantially non-flush configuration.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
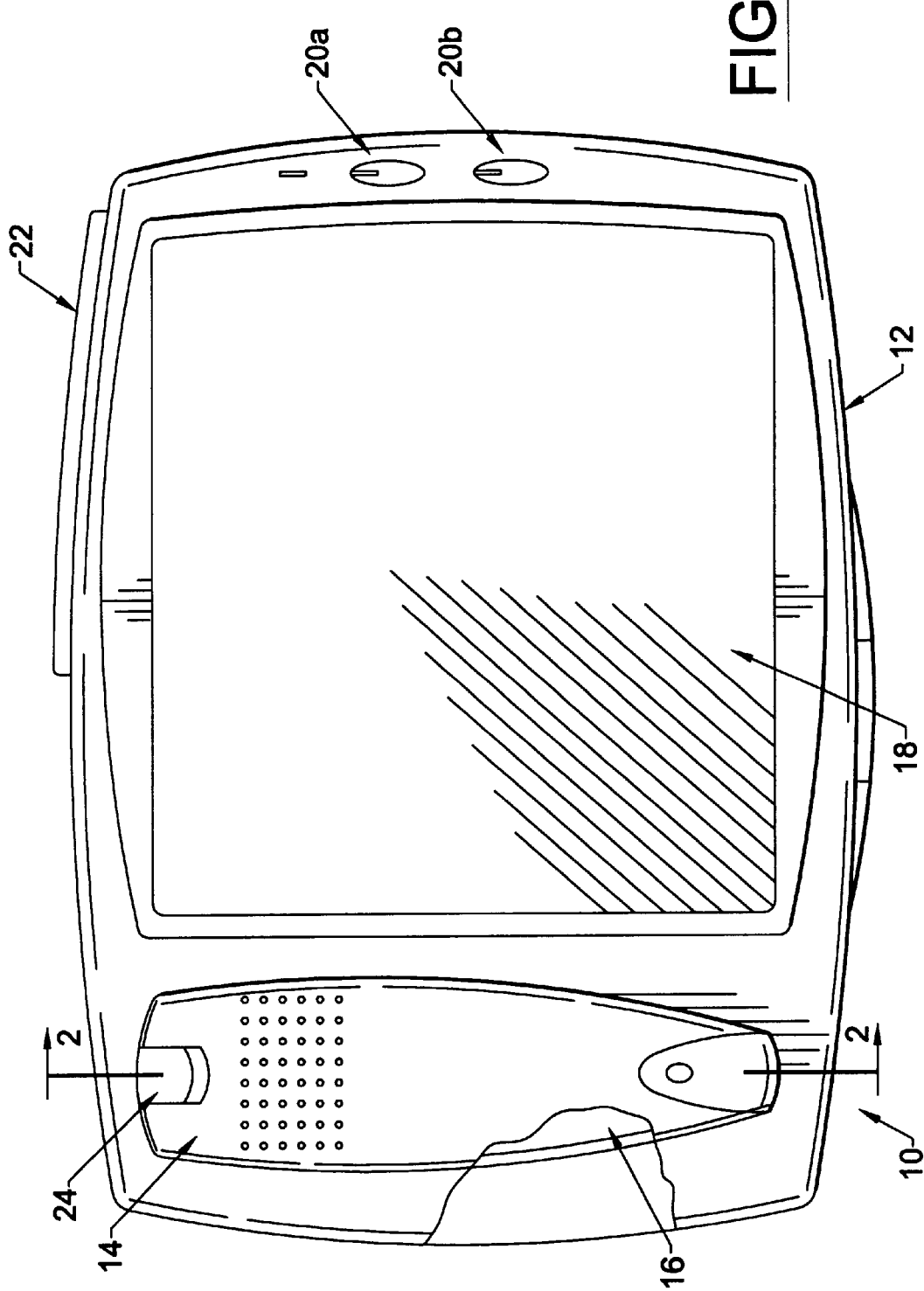
FIG. 1 is a front plan view of a PDA having a handset secured within a cradle in a substantially flush configuration.

Referring now to FIG. 1, a personal digital assistant (PDA) 10 having a removable handset that is positionable in both a substantially flush and a non-flush configuration, is illustrated. The PDA 10 includes a base 12 with a handset 14 removably secured within a cradle 16 recessed within the base. In the illustrated embodiment, the base 12 includes a display screen 18, which is typically a "touch screen", a power on/off button 20a, a "handsfree" operation button 20b and an antenna 22 for communicating with a remote base station. A latching mechanism 24 facilitates removing the handset 14 when secured within the cradle 16.

The illustrated PDA 10 preferably performs various laptop computing functions and includes a central processing unit, a keyboard, and access to persistent data storage (not shown). The keyboard and touch screen are in communication with the central processing unit. The central processing unit preferably contains one or more microprocessors or other computational devices and random access memory or its functional equivalent, including but not limited to, RAM, FLASHRAM, and VRAM for storing programs therein for processing by the microprocessor(s) or other computational devices. Other features of a PDA which are not illustrated, but which may be included, are PCMCIA slots for connecting the PDA to modems and other devices, a stylus for use with the touch screen 18, RJ11 connections to land line telephone systems, and infrared ports for communications with peripheral devices.

The base 12 houses a power supply (not shown) which preferably includes one or more rechargeable direct current (DC) batteries. The power supply is charged via an electrical cord configured to be inserted in a standard 110 volt alternating current (AC) electrical outlet. The power supply serves as a recharging source for the battery-operated handset, which is described below. However, it is to be understood that various types of power supplies may be used within PDAs, and the present invention is not limited to the use of DC power supplies.

Figure 2:
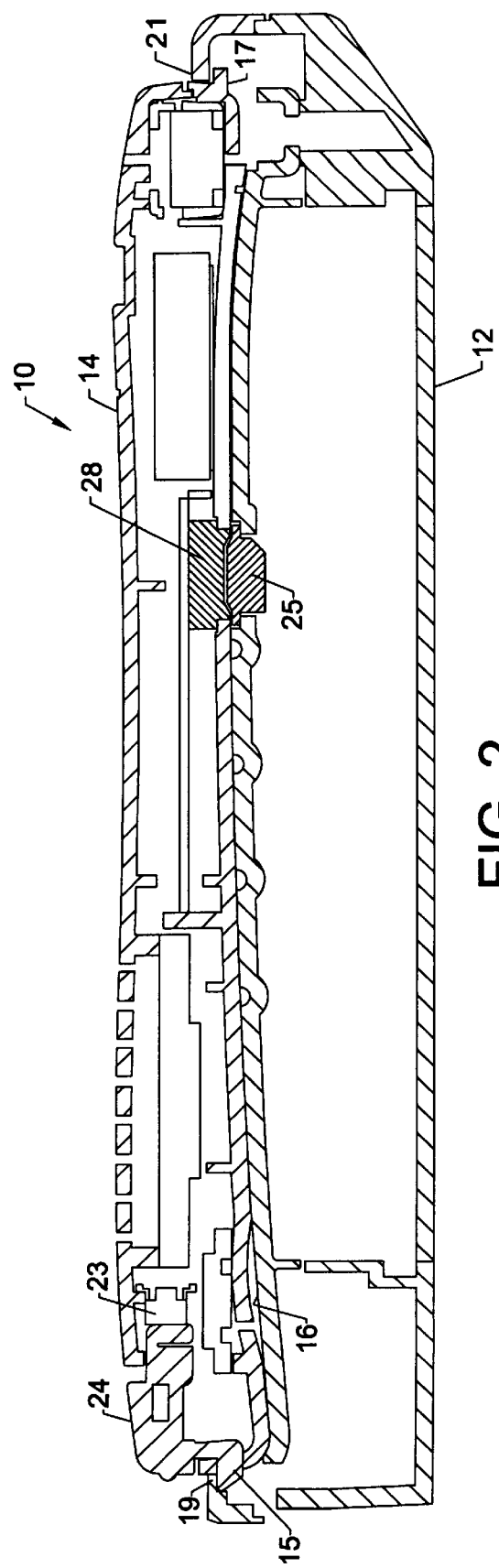
FIG. 2 is a section view of the PDA and handset illustrated in FIG. 1 taken along lines 2—2.

Referring now to FIG. 2, the handset 14 is removably secured within the cradle 16 by a pair of tongues 15 and 17 configured to engage respective lip portions 19 and 21 of cradle opposing side portions. A latching mechanism 24 is biased by spring 23 such that tongue 15 cooperates with lip portion 19 to securely retain the handset 14 within the cradle 16 in a substantially flush configuration with respect to the base 12. When the latching mechanism 24 is pressed by a user, the tongue 15 is becomes disengaged from the lip portion 19. To removably secure the handset 14 within the cradle 16, the tongue 17 is inserted so as to engage the lip portion 21 and then the tongue 15 is snapped into place against the force of the spring 23, as illustrated in FIG. 2. The latching mechanism 24 allows the PDA 10 to be carried without risk of the handset 14 becoming dislodged or damaged. It is preferable that the handset 14 be buried deep within the base 12 for protection of the handset. However, non-flush configurations may be utilized as well without departing from the spirit and intent of the present invention as long as the handset 14 is protected from dislodgment.

Figure 3:
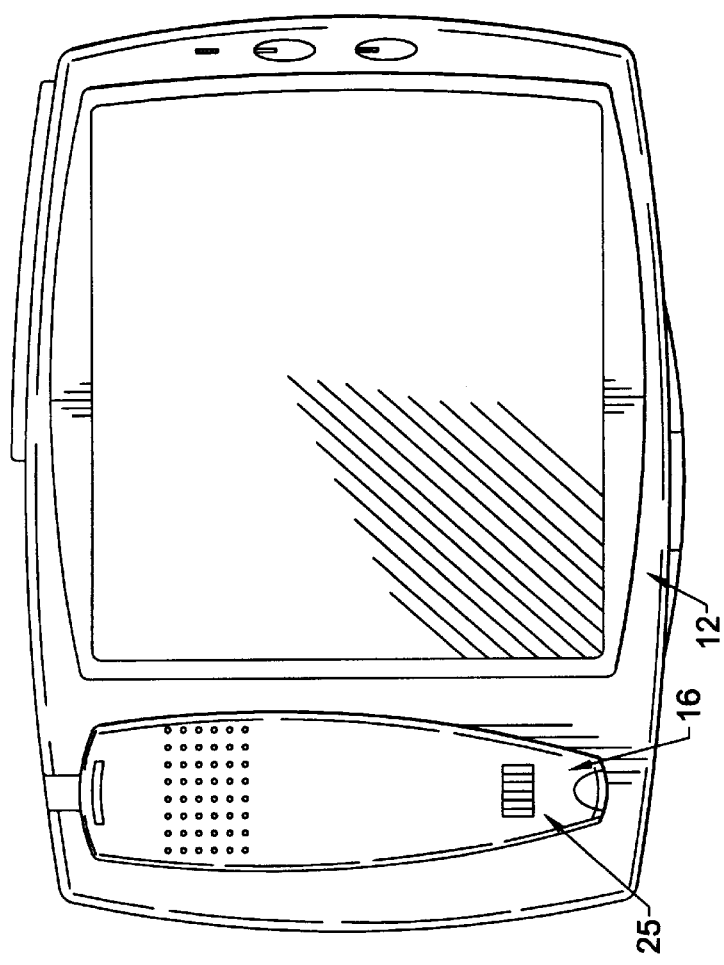
FIG. 3 is a front plan view of the PDA illustrated in FIG. 1 with the handset removed from the cradle.
Figure 3:
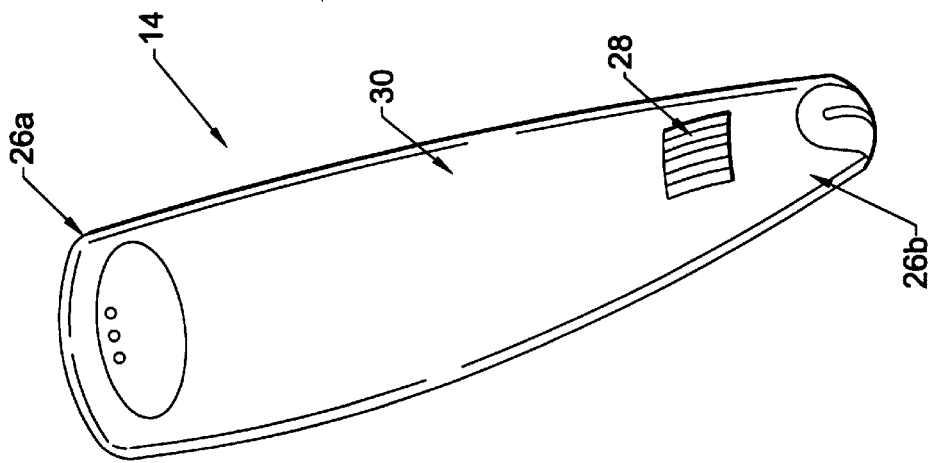

Still referring to FIG. 2, the cradle 16 has a first electrical connector 25 positioned therewithin. The first electrical connector 25 is electrically connected to the power supply (not shown) located within the base 12. Referring now to FIG. 3, the illustrated handset 14 has an elongated shape with opposing first and second end portions 26a and 26b. In operation, a user listens through the first end portion 26a and speaks through the second end portion 26b. The handset 14 preferably has a shape complimentary to the shape of the recessed cradle 16 to facilitate positioning the handset within the cradle in a secure and substantially flush configuration with respect to the base 12.

A second electrical connector 28 is positioned along a medial portion 30 of the handset 14 as illustrated. The second electrical connector 28 is electrically connected to a rechargeable power storage device (not shown) located within the handset 14. The power storage device provides operational power to the handset 14 because the handset is not tethered to the base 12. The power storage device typically includes one or more rechargeable batteries.

When the handset 14 is in a substantially flush configuration within the cradle 16, as illustrated in FIGS. 1–2, the second electrical connector 28 located on the medial portion 30 of the handset 14 is in electrical contact with the first electrical connector 25 in the cradle to thereby electrically connect the power storage device in the handset 14 with the power supply in the base 12. When the handset 14 is in a substantially non-flush configuration with respect to the base 12, as described below, the second electrical connector 28 is electrically connected with the first electrical connector 25 in the cradle via an adapter 38.

Figure 4:
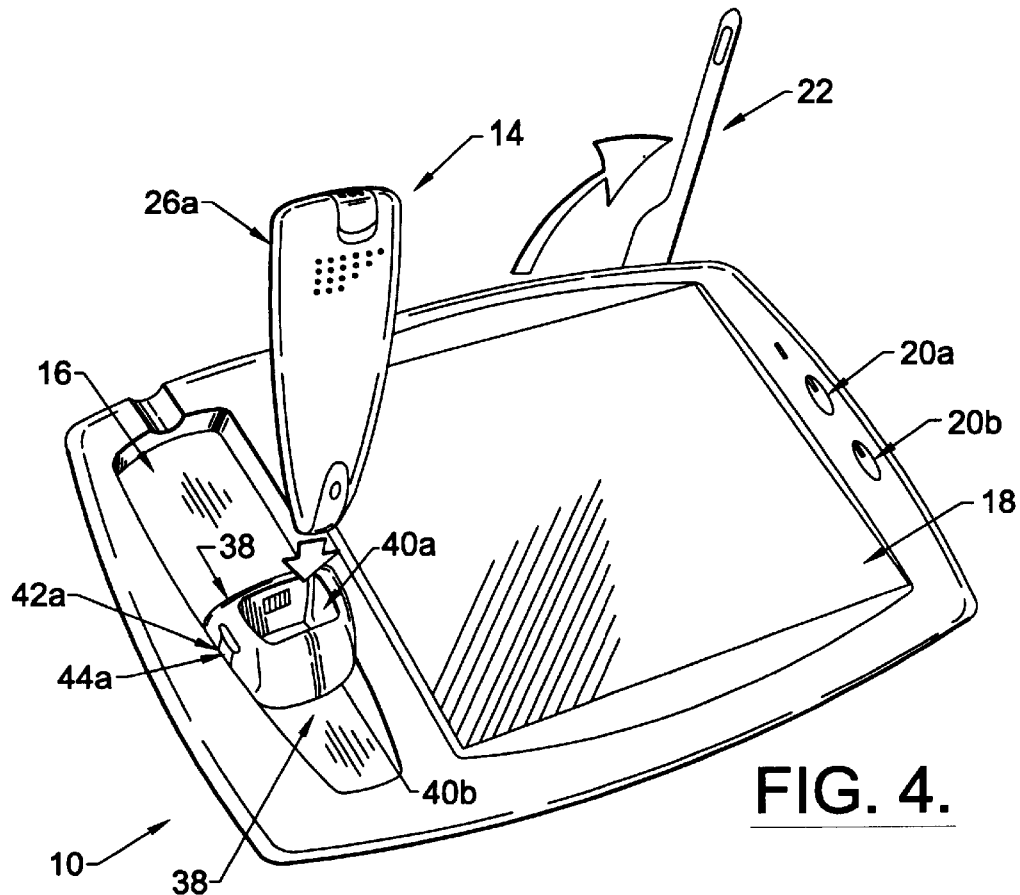
FIG. 4 is a perspective view of the PDA illustrated in FIG. 1 showing the handset being inserted into the adapter in a substantially non-flush configuration.

Referring now to FIG. 4, the PDA 10 is illustrated with the handset 14 being inserted in a substantially non-flush configuration with respect to the base 12. An adapter 38 is configured to be removably secured to the base 12 such that it overlies the first electrical connector 25 located in the cradle 16. The illustrated adapter 38 has a generally tubular shape with opposing first and second end portions 40a and 40b. The first end portion 40a is configured to receive the second end portion 26b of the handset 14 and removably secure the handset therein. When the adapter 38 is removably secured to the base 12 and the handset 14 is removably secured within the adapter first end portion 40a, the handset is positioned such that a user can easily grasp and remove it from the adapter 38 for use. The adapter 38 can be configured to position the handset 14 in almost any configuration that is not flush with the base 12 and that allows a user to easily grasp the handset. The adapter 38 is not limited to the illustrated configuration or to the illustrated angle within which the handset 14 is held with respect to the base 12.

The opposing sides of the cradle 16 have respective lip portions 42a and 42b formed therein and located such that the first electrical connector 25 is positioned therebetween. The adapter 38 includes a pair of spaced apart biased or spring activated tabs 44a and 44b extending outwardly from the adapter second end portion 40b. Each tab 44a, 44b is configured to cooperate with a respective lip portion 42a, 42b on the sides of the cradle 16 and thereby removably secure the adapter 38 to the base 12. The present invention is not limited to the illustrated configuration of the tabs 44a, 44b and the respective lip portions 42a, 42b with which they cooperate. Various ways of securing the adapter 38 to the base such that the handset 14 is easily grasped by a user and such that the power storage device is electrically connected to the power supply can be utilized without departing from the spirit and intent of the present invention.

Figure 5:
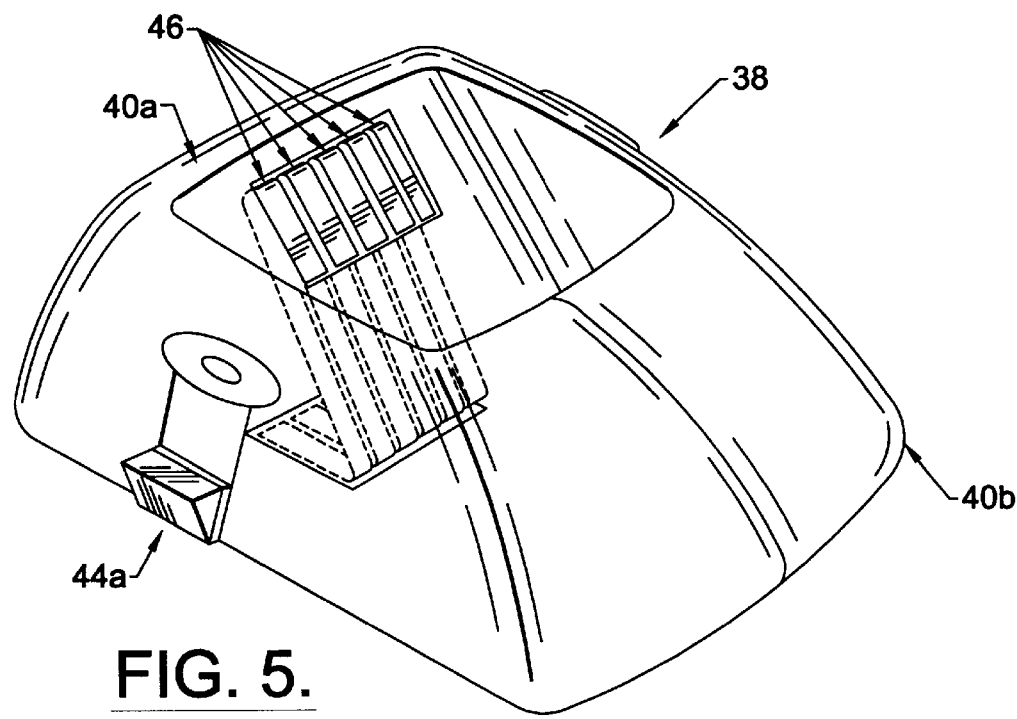
FIG. 5 is a perspective view of an adapter for removably securing a handset to a PDA in a substantially non-flush configuration.
Figure 6:
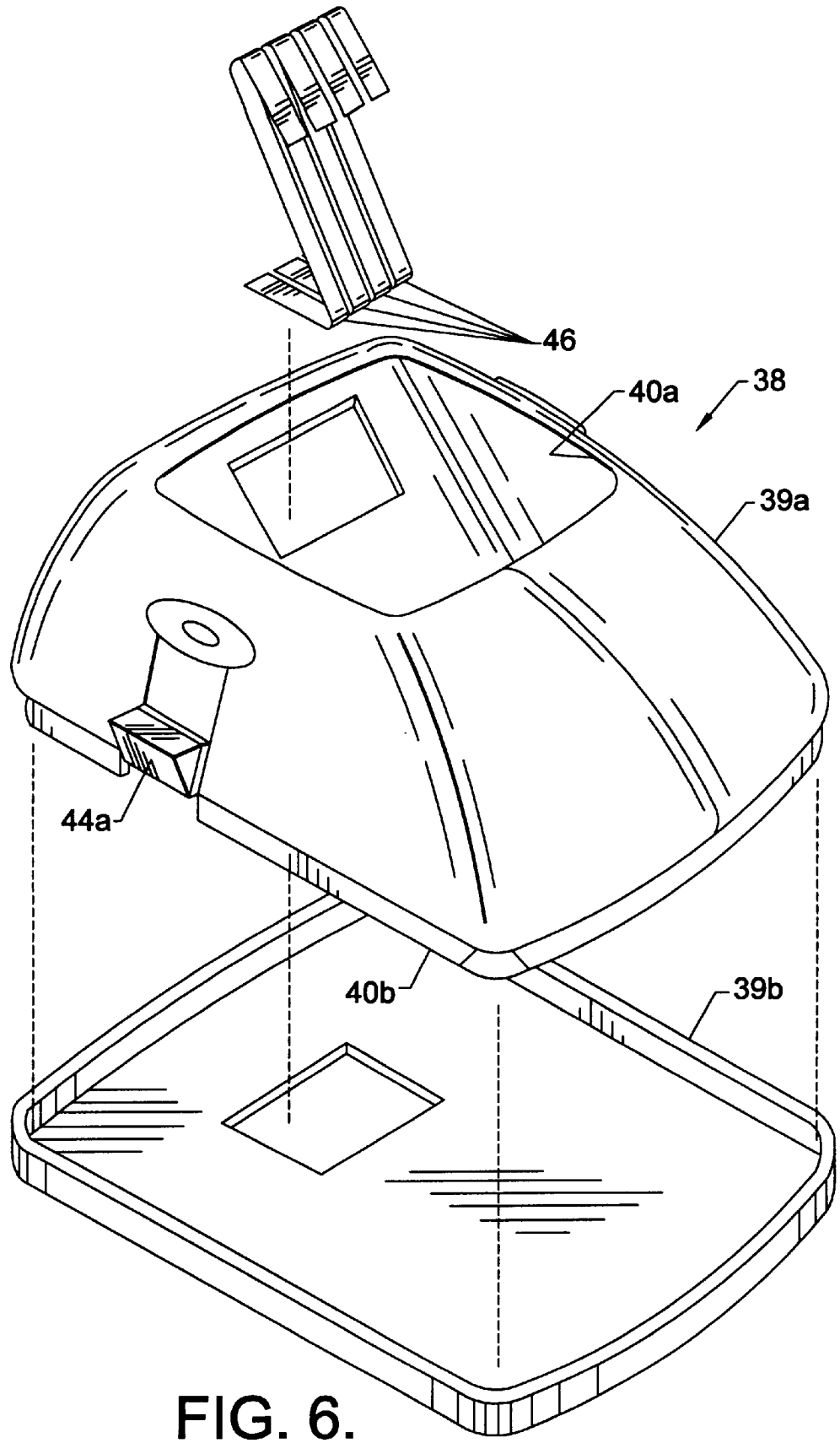
FIG. 6 is an exploded perspective view of the adapter illustrated in FIG. 5.

Referring now to FIGS. 5–6, the adapter 38 of FIG. 4 is illustrated in greater detail. The illustrated adapter 38 includes an upper portion 39a and a lower portion 39b and a plurality of conductive traces 46 extending therethrough between the first and second end portions 40a and 40b. The conductive traces 46 may be integral with the adapter housing via printing or co-molding techniques.

Referring now to FIGS. 7–8, the positioning of the handset 14 within the adapter 38 is illustrated in greater detail. As illustrated, the conductive traces 46 in the adapter 38 electrically connect the first electrical connector 25 in the base 12 with the second electrical connector 28 in the handset 14. The present invention is not limited to an adapter which provides the illustrated angle of inclination of the handset 14 with respect to the base 12. An adapter may be configured such that the handset 14 is at any desirable angle with respect to the base 12.

When the adapter 38 is removably secured to the base 12, as illustrated in FIG. 4, the conductive traces 46 are electrically connected to the first electrical connector 25 in the cradle. When the handset 14 is removably secured within the first end portion 40a of the adapter 38, the conductive traces 46 are electrically connected to the second electrical connector 28 located on the handset 14. The conductive traces 46 serve the function of electrically connecting the power storage device in the handset 14 with the power supply in the base 12 when the handset is in a substantially non-flush configuration. The present invention is not limited to the illustrated configuration of the adapter 38 or of the conductive traces 46.

According to another aspect of the present invention, the adapter 38 may be utilized to electrically connect other devices to a power supply within the PDA 10. For example, a keyboard utilizing a rechargeable power storage device may have a connector configured to be removably inserted within the adapter first end portion 40a. In addition, the PDA 10 may include additional electrical connectors for connecting various peripheral devices with a PDA power supply.

According to a further aspect of the present invention, the first electrical connector 25 may be formed integrally with the base 12. Conductive material may be utilized to electrically connect a power supply to a portion of the cradle that is in contacting relationship with either the conductive traces 46 of the adapter 38 or the second electrical connector 28 of the handset 14. Similarly, the second electrical connector 28 may be formed integrally with the housing of the handset 14 via the use of conductive materials embedded within the handset housing. Conductive material within the housing may be utilized to electrically connect respective portions of the handset to the power storage device within the handset.

Typically, the adapter 38, the handset 14, and the base 12 are formed of the same material so that the color and gloss of these separate components can be matched. Preferably, these components are formed of a thermoplastic, with polycarbonate being particularly preferred. Those skilled in the art will appreciate, however, that other materials may also be suitable for use with the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A personal digital assistant comprising:
   a base having a recessed handset cradle and power supply means therewithin;
   a handset having a configuration complementary to said cradle and configured to be removably secured within said cradle in a substantially flush configuration with said base, said handset having power storage means therewithin;
   a first electrical connector within said cradle electrically connected to said power supply means;
   a second electrical connector on said handset electrically connected to said power storage means, wherein said second electrical connector is configured to make electrical contact with said first electrical connector when said handset is in a substantially flush configuration;
   an adapter having opposite first and second ends, said first end configured to be removably secured to said base overlying said first electrical connector, said second end configured to removably receive said handset therein; and
   second means for electrically connecting said power storage means to said power supply means when said handset is removably secured to said base in a substantially non-flush configuration.

2. A personal digital assistant according to claim 1, wherein said first means for electrically connecting said power storage means to said power supply means when said handset is in a substantially flush configuration comprises:
   a first electrical connector within said cradle electrically connected to said power supply means; and
   a second electrical connector on said handset electrically connected to said power storage means, wherein said second electrical connector is configured to make electrical contact with said first electrical connector when said handset is in a substantially flush configuration.

3. A personal digital assistant according to claim 1, wherein said first electrical connector is integral with said base.

4. A personal digital assistant according to claim 1, wherein said second electrical connector is integral with said handset.

5. A personal digital assistant according to claim 1, wherein said second means for electrically connecting said power storage means with said power supply means when said handset is in a substantially non-flush configuration comprises means within said adapter for electrically connecting said first and second electrical connectors.

6. A personal digital assistant according to claim 5, wherein said means for electrically connecting said first and second electrical connectors comprises a plurality of conductive traces extending between said adapter first and second ends.

7. A personal digital assistant according to claim 1, further comprising:
   a central processing unit within said base;
   a display screen in communication with said central processing unit; and
   means for providing user input to said central processing unit via said display screen.

8. A personal digital assistant comprising:
   a base having a recessed handset cradle, said cradle having a first electrical connector electrically connected to a power supply;
   a handset having a configuration complementary to said cradle and configured to be removably secured therewithin in a substantially flush configuration with said base, said handset comprising:
      a medial portion having a second electrical connector electrically connected to a power storage device within said handset, said second electrical connector configured to engage said first electrical connector when said handset is in a substantially flush configuration to thereby electrically connect said power storage device with said power supply; and an adapter configured to be removably secured to said base overlying said first electrical connector, said adapter having means for removably receiving an end portion of said handset such that said handset is in a substantially non-flush configuration with said base, and such that said second electrical connector is in electrical contact with said first connector.

9. A personal digital assistant according to claim 8, wherein said recessed handset cradle comprises a pair of opposing lip portions formed in opposing edge portions of said recessed handset cradle with said first electrical connector positioned therebetween.

10. A personal digital assistant according to claim 9, wherein said adapter comprises a pair of spaced apart biasing tabs extending outwardly therefrom, each tab configured to cooperate with a respective lip portion and thereby removably secure said adapter to said base.

11. A personal digital assistant according to claim 9, further comprising:

a central processing unit within said base;

a display screen in communication with said central processing unit; and means for providing user input to said central processing unit via said display screen.

12. A personal digital assistant according to claim 9, wherein said adapter is formed from a thermoplastic material.

13. A personal digital assistant according to claim 12, wherein said thermoplastic material is polycarbonate.

* * * * *